US012657511B2

(12) United States Patent
Bellman et al.

(10) Patent No.: US 12,657,511 B2
(45) Date of Patent: Jun. 16, 2026

(54) TARGET FACTORY

(71) Applicant: Early Warning Services, LLC,
Scottsdale, AZ (US)

(72) Inventors: Jacob M. Bellman, Scottsdale, AZ
(US); Dan M. Hayden, Mesa, AZ
(US); **Abhishek Chambe Venkatesh
Murthy, Scottsdale, AZ (US); John M.
Kohoutek**, Scottsdale, AZ (US);
Anthony J. Moliterno, Scottsdale, AZ
(US)

(73) Assignee: Early Warning Services, LLC,
Scottsdale, AZ (US)

( * ) Notice: Subject to any disclaimer, the term of this
patent is extended or adjusted under 35
U.S.C. 154(b) by 928 days.

(21) Appl. No.: 17/903,446

(22) Filed: Sep. 6, 2022

(65) Prior Publication Data

US 2023/0073719 A1      Mar. 9, 2023

Related U.S. Application Data

(60) Provisional application No. 63/241,332, filed on Sep.
7, 2021.

(51) Int. Cl.
G06N 20/00          (2019.01)

(52) U.S. Cl.
CPC .................................. G06N 20/00 (2019.01)

(58) Field of Classification Search
CPC ....................................................... G06N 20/00
USPC .......................................................... 706/12
See application file for complete search history.

(56) References Cited

U.S. PATENT DOCUMENTS

| | | | | |
|---|---|---|---|---|
| 2010/0280981 A1* | 11/2010 | Kato | ................ | G06F 16/90339 |
| | | | | 706/20 |
| 2017/0193066 A1* | 7/2017 | Zhu | ........................ | G06F 16/254 |
| 2019/0114937 A1* | 4/2019 | Capps | ................... | H04L 67/306 |
| 2019/0197194 A1* | 6/2019 | Larusson | ............... | G06N 20/00 |
| 2019/0377982 A1* | 12/2019 | Ando | ........................ | G06N 20/00 |
| 2020/0012962 A1* | 1/2020 | Dent | ........................ | G06N 3/09 |
| 2020/0065772 A1* | 2/2020 | Whitehead | ............. | G06N 20/00 |
| 2020/0104710 A1* | 4/2020 | Vasudevan | ............... | G06N 3/09 |
| 2020/0125956 A1* | 4/2020 | Ravi | ........................ | G06N 3/09 |
| 2020/0409945 A1* | 12/2020 | Chen | ................. | G06F 16/24578 |
| 2021/0049628 A1* | 2/2021 | Baird | ................... | G06N 3/0464 |
| 2021/0081377 A1* | 3/2021 | Polleri | ..................... | G06F 8/75 |
| 2021/0182700 A1* | 6/2021 | Bax | ........................ | G06N 5/046 |
| 2021/0241177 A1* | 8/2021 | Wang | ........................ | G06N 5/04 |
| 2021/0256310 A1* | 8/2021 | Roberts | .............. | G06F 18/2148 |
| 2022/0318621 A1* | 10/2022 | Gong | ........................ | G06N 7/01 |

FOREIGN PATENT DOCUMENTS

| | | | | |
|---|---|---|---|---|
| CN | 112948889 A | * | 6/2021 | ............. G06N 20/00 |

* cited by examiner

*Primary Examiner* — Hwei-Min Lu
(74) *Attorney, Agent, or Firm* — Kilpatrick Townsend &
Stockton LLP

(57) ABSTRACT

A method of operating a machine learning target factory may
include generating a plurality of machine learning targets.
The method may include storing each of the plurality of
machine learning targets on a network-attached database.
The method may include receiving, at the network-attached
database, a request for at least one of the plurality of
machine learning targets for a machine learning model. The
method may include providing the at least one of the
plurality of machine learning targets to a computing device
housing the machine learning model.

17 Claims, 3 Drawing Sheets

200

Generate a number of
machine learning targets
202

Store machine learning
targets in target factory
204

Receive a request for at least
one machine learning target
206

Provide machine learning
targets to a machine learning
model
208

200

305

| PROCESSOR(S) | 310 |
| STORAGE DEVICE(S) | 325 |
| INPUT DEVICE(S) | 315 |
| OUTPUT DEVICE(S) | 320 |
| COMMUNICATIONS SUBSYSTEM | 330 |

WORKING MEMORY

OPERATING SYSTEM

340

345

335

APPLICATION(S)

300

TARGET FACTORY

CROSS-REFERENCE TO RELATED APPLICATIONS

This application claims the benefit of U.S. Provisional Application Ser. No. 63/241,332, filed on Sep. 7, 2021, entitled "TARGET FACTORY", the disclosure of which is incorporated by reference herein in its entirety.

BACKGROUND OF THE INVENTION

Machine learning (ML) models are complex algorithms that can be powerful predictive tools. Like any type of model, the power of an ML model relies heavily on the targets used to train the model. In many cases, the generation of robust targets from a dataset may take considerable time due to the vast amounts of data analyzed, as well as the complexity of the algorithm used to parse the targets. Developers may design machine learning models that require similar targets, which often requires the developers to build redundant algorithms that generate the targets for each machine learning model or to manually retrieve previously generated targets for a given project, which may be a time-consuming and error-prone process. This increases the time to design and construct a new machine learning algorithm, which may increase the time and resources needed to generate a particular machine learning model. Therefore, improving the efficiency of machine learning target generation is desirable.

BRIEF SUMMARY OF THE INVENTION

Embodiments of the present invention are directed to target factories that enable machine learning models to automatically access and utilize previously generated machine learning targets. The target factory may be implemented on a network attached storage device that enables the target factory to be readily updated and easily accessed using data calls. This may enable developers to reuse targets that have been previously generated when developing and testing new models.

One aspect of the disclosure provides for a method of operating a machine learning target factory, using one or more processors, comprising: generating a plurality of machine learning targets; storing each machine learning target of the plurality of machine learning targets on a network-attached database; receiving, at the network-attached database, a request for at least one machine learning target of the plurality of machine learning targets for a machine learning model; and providing the at least one machine learning target of the plurality of machine learning targets to a computing device housing the machine learning model. Each machine learning target of the plurality of machine learning targets may be associated with one or both of a user and an account. Generating at least some of the plurality of machine learning targets may include performing string matching on data files. Performing string matching on the data files may include looking for a string of characters that that includes at least one of definitive status, a probable target match, or a possible target match. The method may further comprise determining a confidence indicator for each of the at least some of the plurality of machine learning targets based on the at least one of the definitive status, probably target match, or possible target match. The method may further comprise providing at least one of the confidence indicator to the computing device. At least some of the confidence indicators may comprise numerical scores. The data files may be provided by a financial institution.

A further aspect of the disclosure provides for a machine learning target factory, comprising: a communications interface that is communicatively coupled to a machine learning network via one or more networks; and a memory, the memory comprising: a plurality of previously generated machine learning targets. Each of the plurality of previously generated machine learning targets may be associated with one or both of a user and an account. At least some of the plurality of previously generated machine learning targets may be associated with a confidence indicator that represents how likely the targets are associated with a given target. At least some of the confidence indicators may comprise numerical scores.

A yet further aspect of the disclosure provides for a system, comprising: one or more computing devices; and memory storing instructions, the instructions being executable by the one or more computing devices, wherein the one or more computing devices are configured to: generate a plurality of machine learning targets; store each machine learning target of the plurality of machine learning targets on a network-attached database; receive, at the network-attached database, a request for at least one machine learning target of the plurality of machine learning targets for a machine learning model; and provide the at least one machine learning target of the plurality of machine learning targets to a computing device housing the machine learning model. Each machine learning target of the plurality of machine learning targets may be associated with one or both of a user and an account. Generating at least some of the plurality of machine learning targets may include performing string matching on data files. Performing string matching on the data files may include looking for a string of characters that that includes at least one of definitive status, a probable target match, or a possible target match. The system may further comprise determining a confidence indicator for each of the at least some of the plurality of machine learning targets based on the at least one of the definitive status, probably target match, or possible target match. The system may further comprise providing at least one of the confidence indicator to the computing device. At least some of the confidence indicators may comprise numerical scores. The data files may be provided by a financial institution.

DETAILED DESCRIPTION OF THE INVENTION

Figure 1:
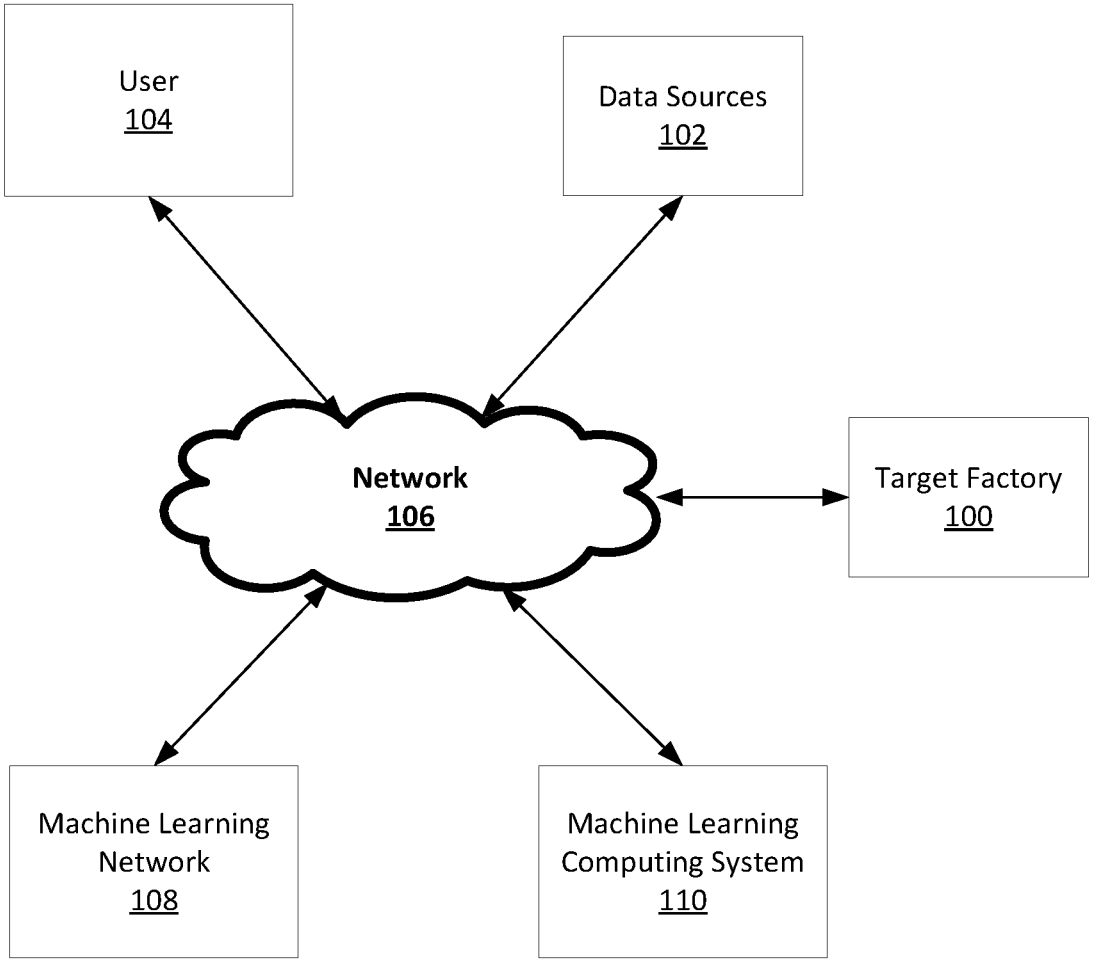
FIG. 1 illustrates a system for generating a machine learning target factory according to an embodiment of the present invention.

Embodiments of the present invention are directed to target factories for machine learning models. The target factories may be provided on a network attached storage, which may enable targets stored thereon to be automatically accessed and used in various machine learning models. Traditional methods of defining machine learning targets did not involve any central location of generated targets accessible by machine learning algorithms. Instead, such targets required a human to manually locate and retrieve pre-existing targets for subsequently generated machine learning models. This method is impractical as there can be a vast number of machine learning models to train at any given time, thus posing an impractical time cost to manually generating such targets. Moreover, such a method is impractical due to the risks of error involved at locating and retrieving a pre-existing target (e.g., an inability to find a target that already exists or locating an incorrect target for use). This risk of error is only further highlighted as the number of targets required increases. An alternative traditional method of generating targets was to simply create redundant target-generating algorithms. However, this is an inherently wasteful and inefficient means of generating targets.

The methods of the present disclosure both eliminates the manual effect and redundant algorithm generation of prior methods. By providing the targets in a target factory housed within a network-attached database, a number of targets are readily available for use by machine learning algorithms without the need to resort to impractical manual labor or inefficient redundant algorithms. By eliminating these problems faced by traditional methods, the speed and efficiency at which multiple machine learning models is greatly increased. Thus, the field of machine learning is improved by allowing for a greater specificity of machine learning models that could not practically be achieved by prior methods. For example, with the methods of the present disclosure, machine learning models can be targeted to each specific user of a financial institution rather than a single catch-all model for all users.

Embodiments enable the developers to include a call to the target factory to retrieve particular targets for use in subsequent machine learning models. For example, the stored targets may be pulled from the target factory to test new proof-of-concept ideas, run ad hoc analysis, and/or aid in model development of new and/or existing models. While the target factories described are discussed herein largely in the context of machine learning models that are used to generate financial determinations, it will be appreciated that such target factories may be utilized in testing machine learning algorithms in any other application. In some embodiments, the targets stored within the target factory that are not used for a predetermined period of time may be removed from the target factory, which may reduce storage requirements and increase the speed at which targets may be identified and retrieved.

Turning now to FIG. 1, a system for generating a target factory 100 is illustrated. The system may include one or more data sources 102. Data sources 102 may collect data records that may be relevant to a particular machine learning model target. For example, the data records may be used as, or to generate, targets as well as input features for a machine learning model. In some embodiments, the data sources 102 may include financial institutions, such as banks, credit unions, brokerage firms, credit card issuers, and/or other entities that service financial accounts for consumers and/or businesses. The financial institutions may also encompass other entities that may operate financial accounts (including issuing and cashing checks and/or other negotiable instruments), offering lending and/or other financing options, and/or otherwise handle financial transactions. Each financial institution may include one or more computing systems that facilitate interactions with users and/or back-end systems. The financial institutions may each maintain records not only of balances associated with each account, but may also maintain records of transactions (e.g., debits and credits) associated with the various accounts, records of checks and/or other negotiable instruments (issued and/or cashed), and/or maintain records of other financial data associated with one or more users.

Additional or alternative data sources may be included in some embodiments. For example, other data sources may provide one or more types of data that may or may not be available (or readily identifiable) within account data from the financial institutions. For example information about payroll checks/deposits, rent payments, mortgage payments, utility bill payments, and/or other information may be provided by other data sources, such as payroll processors, utility companies, mortgage providers, financial technology (Fintech) companies and/or banking as a service platforms. It will be appreciated that in some embodiments, data sources that provide non-financial data may be included in the system as well. Such data may be used in generating machine learning model targets that are related financial determinations as discussed herein and/or may be used to generate any other kind of machine learning target.

The system may include a number of users 104 that may interact with one or more of the financial institutions and/or other data sources 102. For example, the users 104 may maintain one or more financial accounts (checking accounts, savings accounts, credit card accounts, brokerage accounts, cryptocurrency accounts, etc.) at one or more of the financial institutions. Additionally, the users 104 may apply for loans/credit/financing, cash/deposit/issue checks, initiate transfers to and/or from one or more financial accounts, and/or otherwise interact with one or more of the financial institutions. The users 104 may be individuals and/or business entities. The users 104 may interact with the data sources 102 in person at brick and mortar locations and/or using one or more user devices that communicate with the data sources 102 via one or more wired and/or wireless networks 106. The user devices may include mobile phones, tablet computers, personal computers, e-readers, and the like. In some embodiments, the user devices may include computing devices, such as point of sale devices, that may be positioned at brick-and-mortar locations of a given data source 102 and usable by the users to interact with a given data source 102. The user devices may access the data sources 102 via software applications and/or websites that are associated with and/or operated by a given data source 102, and that provide user interfaces that enable the users to perform actions with the data source 102, such as to manage accounts, conduct transactions, and/or apply for funds when the data source 102 is a financial institution.

The system may include a machine learning network 108, which may be in direct and/or indirect communication with the target factory 100, data sources 102, user devices and/or users 104 via the one or more networks 106. The machine learning network 108 may establish relationships with any number of data sources 102, which may enable the machine learning network 108 to access data records (such as detailed account and/or transaction data) associated with each financial account and/or user 104 once the user 104 has consented to providing the data. The machine learning network 108 may access and aggregate the data records from each of the financial accounts identified as being associated with one or more users 104 (e.g., payee and/or payor). This data may be parsed to identify inflow and outflow transactions associated with each financial account, balance data, transaction frequency data, and/or other category of data. The machine learning network 108 may use this data to automatically generate input features that may be supplied to a machine learning computing system 110 (which may or may not be part of and/or operated by the machine learning network 108). In particular, the machine learning network 108 uses a number of data records (such as a check or other negotiable instrument, loan/credit application, transaction, account information, etc.) as input features that are utilized to predict a given target.

For example, the machine learning network 108 may analyze data records received from one or more of the data sources 102 to predict targets. Examples of such targets include indications and/or predictions of first party fraud, third party fraud, whether the user 104 is a money launderer, whether the user 104 is a money mule, whether the user 104 is a synthetic (e.g., a falsified identity), whether the user 104 and/or account has been associated with one or more scams, whether the user 104 has died, whether the user 104 is in debt, whether the user 104 has specific hobbies (e.g., cars, swimming pools, shoes, etc.), whether the user 104 collects unemployment, whether the user 104 has one or more jobs, what type of phone the user 104 has, whether the user 104 utilizes a particular peer to peer payment application and/or other mobile application, whether the user 104 and/or account has been associated with undesirable behavior by a bank (e.g., as identified in a hot file), whether the user 104 has written bad checks, whether the user 104 pays fees that are due, whether the user 104 is married, whether the user 104 will commit fraud, whether the user 104 will enroll with a particular peer to peer payment service and/or other banking service, whether the user 104 will save money by enrolling in a particular peer to peer payment service and/or other banking service, whether the user 104 has had his identity stolen, whether the user 104 has passed counterfeit checks, marketing information (e.g., whether the user 104 is interested in a particular product, service, brand, etc.), and/or other financial or non-financial targets.

The targets may be categorized as being associated with socially unproductive behavior (or "negative"), such as targets related to determining an association with fraudulent behavior and/or may be associated with socially productive behavior (or "positive"), such as targets related to whether a person has performed a positive action (e.g., enrolled in automatic bill pay or direct deposit, contributed to charity, etc.).

The targets may be generated from bank-internal hot files, such as using string matching techniques to flag users with specific negative activity (e.g., money mule behavior). These targets can be used to help train machine learning models. In one particular embodiment, at least one of the targets may indicate whether or not an individual has committed check fraud. For instance, a machine learning model may consume financial history data including account status history, fraud/account abuse history, prior check returns and/or PII sharing activity, and predict whether a user 104 and/or account associated with a given user 104 is likely to commit check fraud.

Once generated, the targets may be stored in the target factory 100. The target factory 100 may be a database that is provided on a network-attached storage. This enables the targets stored thereon to be readily accessible by the machine learning network 108 and/or machine learning computing system 110. In some embodiments, each target may be associated with a user 104 and/or an account, such as a financial account. In some embodiments, the target factory 100 may be organized as a database that includes any number of targets that are each associated with at least one user 104 and/or account. In a particular embodiment, for each user 104 and/or account, the target factory 100 may include an indication of whether the particular user 104 and/or account is associated with each target. For example, the target factory 100 may include a number of data fields for each user 104 and/or account, with each data field representing a different target. Each data field may be populated with an entry that indicates whether the respective user 104 and/or account has a positive or negative result (e.g., 0/1, yes/no, etc. in some embodiments) for a given target. In some embodiments, when a particular target is not applicable to a given user 104 and/or account, rather than including a negative result, the target factory 100 may leave the corresponding data field blank. In some embodiments some targets may be provided to the target factory 100 in a different format than other targets. The target factory 100 may automatically convert each uploaded target to a uniform format that enables software calls to the target factory 100 to have a single call format and to consistently return the correct results to a given machine learning model. In some embodiments, one or more of the targets may include a date on which the target was generated and/or a date on which a user 104 and/or account was associated with behavior related to a given target. For example, if a user 104 wrote a bad check on a particular date, the target factory 100 may include the particular date in a data field related to a target of users 104 who have written bad checks.

In some embodiments, at least some of the targets in the target factory 100 may be associated with a confidence indicator, which may represent how likely a user 104 and/or account are to be associated with a given target. As just one example, a particular machine learning model may be able to determine that a user 104 is not a money launderer, is likely a money launderer, and/or is definitively a money launderer. In embodiments where the target is determined based on an analysis of hot files, certain character strings may be indicative of a particular user 104 and/or account matching a target (e.g., the character string may say user X is a money launderer), indicative of a particular user 104 and/or account possibly and/or likely matching a target, and/or a particular user 104 and/or account definitively not matching a target.

Such analysis may be set up as a decision tree in some embodiments. For example, the string matching may first look for a string of characters that determines whether a user is a definitive status (e.g., the user is definitively a money launderer), then look for a string of characters that indicates a probable target match (e.g., the user is probably a money launderer), and then a string of characters that indicates a possible target match (e.g., the user is possibly a money launderer). This matching provides a more efficient approach in finding a specifically desired target, rather than doing a blanket search of all available targets.

Each level of the decision tree may represent a particular confidence indicator. In some embodiments, the confidence indicators may include numerical scores. As just one example, the score may represent a probability that a particular user 104 and/or account matches a particular target. For example, if a user 104 is a money launderer, the confidence score may be 1 or 100, while if the user is not a money launderer the confidence score may be 0. Intermediate values may be assigned to represent probabilities between the absolute outcomes. It will be appreciated that any type of numerical scoring ranges and intervals may be used to meet the needs of a particular application.

The target factory 100 may be updated periodically and/or in real-time as new targets are generated and/or updated. This may ensure that any new targets are available for use by other machine learning models to help improve the testing of new proof-of-concept ideas, the running of ad hoc analysis, and/or may aid in model development. In some embodiments, targets stored within the target factory 100 that are not accessed and/or otherwise unused for a predetermined period of time may be removed from the target factory 100, which may reduce storage requirements and increase the speed at which targets may be identified and retrieved.

Figure 2:
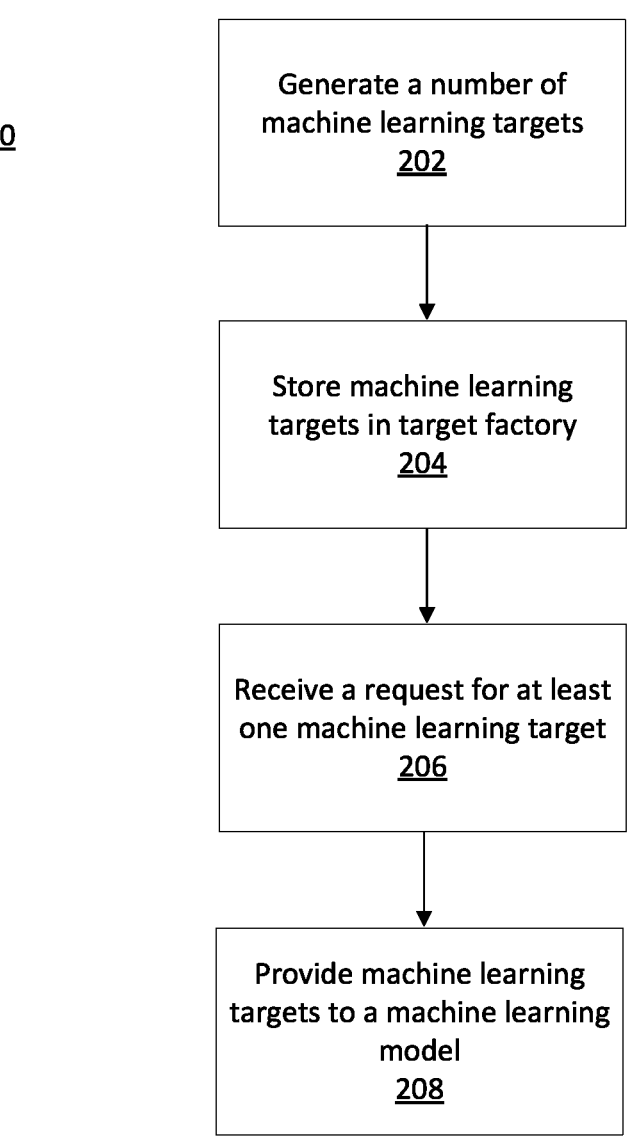
FIG. 2 is a flowchart illustrating a process for operating a machine learning target factory according to an embodiment of the present invention.

FIG. 2 is a flowchart illustrating a process 200 of operating a machine learning target factory according to an embodiment of the present invention. Process 200 may be performed by the target factory 100, machine learning network 108, and/or machine learning computer system 110. Process 200 may begin at operation 202 by generating a number of machine learning targets. Each machine learning target may be associated with a user 104 and/or an account in some embodiments. As indicated above, the targets may pertain to any desired outcome. For example, the targets may indicate and/or predict first party fraud, third party fraud, whether a user 104 is a money launderer, whether a user 104 is a money mule, whether a user 104 is a synthetic, whether a user 104 and/or account has been associated with one or more scams, whether a user 104 has died, whether a user 104 is in debt, whether a user 104 has specific hobbies (e.g., cars, swimming pools, shoes, etc.), whether a user 104 collects unemployment, whether a user 104 has one or more jobs, what type of phone a user 104 has, whether a user 104 utilizes a particular peer to peer payment application and/or other mobile application, whether a user 104 and/or account has been associated with undesirable behavior by a bank (e.g., as identified in a hot file), whether a user 104 has written bad checks, whether a user 104 pays fees that are due, whether a user 104 is married, whether a user 104 will commit fraud, whether a user 104 will enroll with a particular peer to peer payment service and/or other banking service, whether a user 104 will save money by enrolling in a particular peer to peer payment service and/or other banking service, whether a user 104 has had his identity stolen, whether a user 104 has passed counterfeit checks, marketing information (e.g., whether a user 104 is interested in a particular product, service, brand, etc.), and/or other financial or non-financial targets. In a particular embodiment, at least some of the targets may be generated by performing string matching on data files (such as hot files) provided by a financial institution. Oftentimes, the targets are provided directly from the banks (or other data source). For example, banks may provide files that directly indicate accounts and/or people that have committed fraud or are associated with some other target.

At operation 204, each of the machine learning targets may be stored in a target factory 100 in the form of a network-attached database. As indicated above, the target factory 100 may be communicatively coupled with a machine learning network 108 and/or machine learning computing system 110 via one or more networks 104, which enables the targets to be accessed and used by other machine learning models. For example, at operation 206 the target factory 100 may receive a call or request for at least one machine learning target for a machine learning model. As just one example, the request may be for all users 104 and/or accounts that match a particular target, such as being identified as being or associated with a money launderer. In some embodiments, the request may include a date range for which users 104 and/or accounts associated with a given target should be returned. For example, the request may query the target factory 100 for all users 104 who have committed fraud or likely committed fraud over the last year. The identified machine learning targets may be provided to the machine learning model at operation 208. In some embodiments, a confidence indicator (which may be a numerical score in some embodiments) associated with a given user 104 and/or account may be returned along with the target. The requesting machine learning model may then use the received targets as part of an analysis for a different target or other outcome.

Figure 3:
FIG. 3 is a block diagram of a computing system according to an embodiment of the present invention.

A computer system as illustrated in FIG. 3 may be incorporated as part of the previously described computerized devices. For example, computer system 300 can represent some of the components of computing devices, such as target factory 100, data sources 102, devices of the users 104, machine learning network 108, machine learning computing system 110, and/or other computing devices described herein. FIG. 3 provides a schematic illustration of one embodiment of a computer system 300 that can perform the methods provided by various other embodiments, as described herein. FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include a processing unit 310, including without limitation one or more processors, such as one or more central processing units (CPUs), graphical processing units (GPUs), special-purpose processors (such as digital signal processing chips, graphics acceleration processors, and/or the like); one or more input devices 315, which can include without limitation a keyboard, a touchscreen, receiver, a motion sensor, a camera, a smartcard reader, a contactless media reader, and/or the like; and one or more output devices 320, which can include without limitation a display device, a speaker, a printer, a writing module, and/or the like.

The computer system 300 may further include (and/or be in communication with) one or more non-transitory storage devices 325. The one or more non-transitory storage devices 325 can comprise, without limitation, local and/or network accessible storage, and/or can include, without limitation, a disk drive, a drive array, an optical storage device, a solid-state storage device such as a random access memory ("RAM") and/or a read-only memory ("ROM"). The one or more non-transitory storage devices 325 can be programmable, flash-updateable and/or the like. Such storage devices may be configured to implement any appropriate data stores, including without limitation, various file systems, database structures, and/or the like.

The computer system 300 might also include a communication interface 330, which can include without limitation a modem, a network card (wireless or wired), an infrared communication device, a wireless communication device and/or chipset (such as a Bluetooth™ device, an 502.11 device, a Wi-Fi™ device, a WiMAX™ device, an NFC device, cellular communication facilities, etc.), and/or similar communication interfaces. The communication interface 330 may permit data to be exchanged with a network (such as the network 106, to name one example), other computer systems, and/or any other devices described herein. Data transmitted across the networks 106 may be secured using encryption techniques, hypertext transfer protocol secure (HTTPS), secure sockets layer (SSL), transport layer security (TLS), and/or other security protocol. In many embodiments, the computer system 300 will further comprise a non-transitory working memory 335, which can include a RAM or ROM device, as described above.

The computer system 300 also can comprise software elements, shown as being currently located within the working memory 335, including an operating system 340, device drivers, executable libraries, and/or other code/instructions, such as one or more application programs 345 and/or a machine learning algorithm. Such code/instructions may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 325 described above. In some cases, the storage medium might be incorporated within a computer system, such as computer system 300. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a target generation engine configured to provide some or all of the targets described herein (e.g., machine learning network 108) can comprise hardware and/or software that is specialized (e.g., an application-specific integrated circuit (ASIC), a software method, etc.) or generic (e.g., processing unit 310, applications 345, etc.) Further, connection to other computing devices such as network input/output devices may be employed.

Some embodiments may employ a computer system (such as the computer system 300) to perform methods in accordance with the disclosure. For example, some or all of the procedures of the described methods may be performed by the computer system 300 in response to processing unit 310 executing one or more sequences of one or more instructions (which might be incorporated into the operating system 340 and/or other code, such as an application program 345) contained in the working memory 335. Such instructions may be read into the working memory 335 from another computer-readable medium, such as one or more of the storage device(s) 325. Merely by way of example, execution of the sequences of instructions contained in the working memory 335 might cause the processing unit 310 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 300, various computer-readable media might be involved in providing instructions/ code to processing unit 310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and/or transmission media. Non-volatile media include, for example, optical and/or magnetic disks, such as the storage device(s) 325. Volatile media include, without limitation, dynamic memory, such as the working memory 335. Transmission media include, without limitation, coaxial cables, copper wire, and fiber optics, including the wires that comprise the bus 305, as well as the various components of the communication interface 330 (and/or the media by which the communication interface 330 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 330 (and/or components thereof) generally will receive the signals, and the bus 305 then might carry the signals (and/or the data, instructions, etc. carried by the signals) to the working memory 335, from which the processor(s) 310 retrieves and executes the instructions. The instructions received by the working memory 335 may optionally be stored on a non-transitory storage device 325 either before or after execution by the processing unit 310.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of operating a machine learning target factory, using one or more processors, comprising:
   receiving, by a machine learning network, a plurality of data files from one or more data sources;
   automatically generating, by the machine learning network, a plurality of machine learning targets based on the plurality of data files, wherein each of machine learning target of the plurality of machine learning targets comprises a prediction of whether one or both of a user and an account are associated with a given behavior of a plurality of behaviors;
   storing said each machine learning target of the plurality of machine learning targets on a network-attached database;
   receiving, at the network-attached database using one or more networks, a request from a machine learning computing system for at least one machine learning target of the plurality of machine learning targets for a machine learning model, the request being associated with a particular behavior of the plurality of behaviors;
providing the at least one machine learning target of the plurality of machine learning targets to the machine learning computing system housing the machine learning model; and
using, by the machine learning computing system, the at least one machine learning target of the plurality of machine learning targets to perform analysis using the machine learning model for a different target than the at least one machine learning target of the plurality of machine learning targets.

2. The method of operating the machine learning target factory of claim 1, wherein:
   generating at least some of the plurality of machine learning targets include performing string matching on the plurality of data files.

3. The method of operating the machine learning target factory of claim 2, wherein:
   performing the string matching on the plurality of data files includes looking for a string of characters that includes at least one of definitive status, a probable target match, or a possible target match.

4. The method of operating the machine learning target factory of claim 3, wherein:
   further comprising determining a confidence indicator for each of the at least some of the plurality of machine learning targets based on the at least one of the definitive status, the probable target match, or the possible target match.

5. The method of operating the machine learning target factory of claim 4, further comprising providing at least one of the confidence indicators to the machine learning computing system.

6. The method of operating the machine learning target factory of claim 5, wherein:
   at least some of the confidence indicators comprise numerical scores.

7. The method of operating the machine learning target factory of claim 3, wherein the one or more data sources comprise a financial institution.

8. A machine learning target factory, comprising:
   one or more processors;
   a communications interface that is communicatively coupled to a machine learning network via one or more networks; and
   a memory, the memory comprising:
      a plurality of previously generated machine learning targets, each of the plurality of previously generated machine learning targets comprising a prediction of whether one or both of a user and an account are associated with a given behavior of a plurality of behaviors; and
      instructions that, when executed by the one or more processors, cause the one or more processors to:
         receiving, at a network-attached database using one or more networks, a request from a machine learning computing system for at least one machine learning target of the plurality of machine learning targets for a machine learning model, the request being associated with a particular behavior of the plurality of behaviors; and
         providing the at least one machine learning target of the plurality of machine learning targets to the machine learning computing system housing the machine learning model for use in performing analysis for a different target than the at least one machine learning target of the plurality of machine learning targets.

9. The machine learning target factory of claim 8, wherein:

at least some of the plurality of previously generated machine learning targets are associated with a confidence indicator that represents how likely a respective one of the previously generated machine learning targets are associated with a given target.

10. The machine learning target factory of claim 9, wherein:

the confidence indicator for at least one of the previously generated machine learning targets comprises a numerical score.

11. A system, comprising:

one or more computing devices; and memory storing instructions, the instructions being executable by the one or more computing devices, wherein the one or more computing devices are configured to:

receive a plurality of data files from one or more data sources;

automatically generate a plurality of machine learning targets based on the plurality of data files, wherein each of machine learning target of the plurality of machine learning targets comprises a prediction of whether one or both of a user and an account are associated with a given behavior of a plurality of behaviors;

store said each machine learning target of the plurality of machine learning targets on a network-attached database;

receive, at the network-attached database using one or more networks, a request from a machine learning computing system for at least one machine learning target of the plurality of machine learning targets for a machine learning model, the request being associated with a particular behavior of the plurality of behaviors; and provide the at least one machine learning target of the plurality of machine learning targets to the machine learning computing system housing the machine learning model for use in performing analysis for a different target than the at least one machine learning target of the plurality of machine learning targets.

12. The system of claim 11, wherein: generating at least some of the plurality of machine learning targets include performing string matching on the plurality of data files.

13. The system of claim 12, wherein:

performing the string matching on the plurality of data files includes looking for a string of characters that includes at least one of definitive status, a probable target match, or a possible target match.

14. The system of claim 13, further comprising:

determining a confidence indicator for each of the at least some of the plurality of machine learning targets based on the at least one of the definitive status, the probable target match, or the possible target match.

15. The system of claim 14, further comprising providing at least one of the confidence indicators to the machine learning computing system.

16. The system of claim 14, wherein:

at least some of the confidence indicators comprise numerical scores.

17. The system of claim 12, wherein the one or more data sources comprise a financial institution.

* * * * *